(12) United States Patent
Casado-Montero et al.

(10) Patent No.: US 11,084,602 B2
(45) Date of Patent: Aug. 10, 2021

(54) AIRCRAFT SYSTEM WITH ASSISTED TAXI, TAKE OFF, AND CLIMBING

(71) Applicant: Airbus Operations, S.L., Getafe (ES)

(72) Inventors: Carlos Casado-Montero, Getafe (ES); Javier Linde Ayllon, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 367 days.

(21) Appl. No.: 16/201,613

(22) Filed: Nov. 27, 2018

(65) Prior Publication Data
US 2019/0161209 A1 May 30, 2019

(30) Foreign Application Priority Data
Nov. 27, 2017 (EP) .................................... 17382801

(51) Int. Cl.
| | | |
|---|---|---|
| *B44F 1/10* | (2006.01) | |
| *B64D 5/00* | (2006.01) | |
| *B64C 25/08* | (2006.01) | |
| *B64F 1/22* | (2006.01) | |
| *B64F 1/10* | (2006.01) | |

(52) U.S. Cl.
CPC .............. *B64F 1/10* (2013.01); *B64C 25/08* (2013.01); *B64D 5/00* (2013.01); *B64F 1/227* (2013.01)

(58) Field of Classification Search
CPC ... B64F 1/10; B64F 1/227; B64D 5/00; B64C 25/08
See application file for complete search history.

(56) References Cited

U.S. PATENT DOCUMENTS

| | | | | |
|---|---|---|---|---|
| 4,802,639 A | * | 2/1989 | Hardy | B64C 37/02 244/137.4 |
| 4,901,949 A | * | 2/1990 | Elias | B64D 5/00 244/49 |
| 5,487,172 A | * | 1/1996 | Hyatt | B60R 16/0373 712/32 |
| 5,503,350 A | * | 4/1996 | Foote | G05D 1/0038 244/1 R |
| 5,792,978 A | * | 8/1998 | Woodall, Jr. | F42D 3/00 102/293 |

(Continued)

FOREIGN PATENT DOCUMENTS

| | | |
|---|---|---|
| GB | 429948 A | 6/1935 |
| GB | 525015 A | 8/1940 |

*Primary Examiner* — Behrang Badii
*Assistant Examiner* — Jalal C Coduroglu
(74) *Attorney, Agent, or Firm* — Greer, Burns & Crain, Ltd

(57) ABSTRACT

An aircraft system with assisted taxi, take-off and climbing, comprising: a main air vehicle capable of performing autonomously the cruising and landing phases of a flight, an auxiliary air vehicle lighter than the main air vehicle and configured to assist the main air vehicle during the taxing and take-off phases of a flight. Main and auxiliary air vehicles are adapted to be detachably connectable, so that the auxiliary air vehicle can assist the main air vehicle when both are attached to each other during taxing, take-off and climbing. The auxiliary air vehicle is an unmanned air vehicle and it is further configured to fly and land when it is detached from the main air vehicle. Aircraft operations cost and aircraft production cost are reduced, by optimizing the design (sizing) and capabilities of some systems of an aircraft.

10 Claims, 3 Drawing Sheets

(56) References Cited

U.S. PATENT DOCUMENTS

| | | | | |
|---|---|---|---|---|
| 6,612,522 B1* | 9/2003 | Aldrin | | B64G 1/002 244/159.3 |
| 7,104,499 B1* | 9/2006 | Arata | | B64C 9/38 244/12.3 |
| 7,409,710 B1* | 8/2008 | Uchil | | H04L 63/08 713/155 |
| 2002/0074454 A1* | 6/2002 | Henderson | | B64C 39/024 244/135 A |
| 2006/0206246 A1* | 9/2006 | Walker | | G06Q 10/00 701/16 |
| 2007/0007389 A1* | 1/2007 | McCoskey | | B64C 25/405 244/118.5 |
| 2007/0007391 A1* | 1/2007 | McCoskey | | B64F 1/31 244/136 |
| 2007/0040063 A1* | 2/2007 | McCoskey | | B64F 1/36 244/114 R |
| 2007/0040066 A1* | 2/2007 | McCoskey | | B64F 1/31 244/137.1 |
| 2008/0083851 A1* | 4/2008 | Perry | | B64F 1/22 244/189 |
| 2008/0188999 A1* | 8/2008 | Mathieu | | G05D 1/0083 701/7 |
| 2009/0294573 A1* | 12/2009 | Wilson | | B64D 5/00 244/2 |
| 2010/0096494 A1* | 4/2010 | Braier | | B64F 1/228 244/50 |
| 2010/0305857 A1* | 12/2010 | Byrne | | G06T 7/73 701/301 |
| 2011/0074161 A1* | 3/2011 | Ippolito | | F03D 5/00 290/55 |
| 2011/0133021 A1* | 6/2011 | Lugg | | B64C 30/00 244/13 |
| 2012/0025006 A1* | 2/2012 | Luther | | B64C 37/02 244/2 |
| 2012/0091259 A1* | 4/2012 | Morris | | B64C 27/02 244/17.13 |
| 2012/0119018 A1* | 5/2012 | Perry | | B64F 1/228 244/50 |
| 2012/0279801 A1* | 11/2012 | Watson | | A63B 21/157 182/19 |
| 2013/0135118 A1* | 5/2013 | Ricci | | G06N 5/02 340/932.2 |
| 2014/0103158 A1* | 4/2014 | Berry | | B64C 29/0033 244/2 |
| 2014/0339372 A1* | 11/2014 | Dekel | | B64C 39/024 244/7 R |
| 2015/0197335 A1* | 7/2015 | Dekel | | B64C 39/024 701/5 |
| 2015/0375850 A1* | 12/2015 | Salesse-Lavergne | | B64C 27/57 244/17.13 |
| 2016/0236790 A1* | 8/2016 | Knapp | | B64C 11/44 |
| 2016/0360594 A1* | 12/2016 | Chemel | | H05B 45/10 |
| 2017/0072755 A1* | 3/2017 | Zhou | | B64C 35/008 |
| 2017/0277185 A1* | 9/2017 | Duda | | B64D 45/00 |
| 2018/0244383 A1* | 8/2018 | Valente | | B64C 29/02 |
| 2018/0290729 A1* | 10/2018 | Shavit | | B64C 13/22 |

* cited by examiner

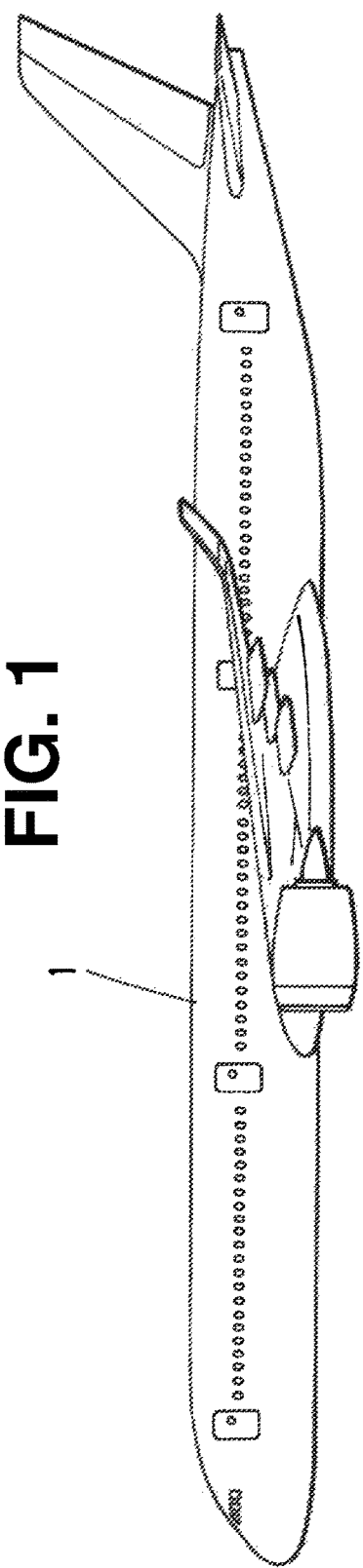
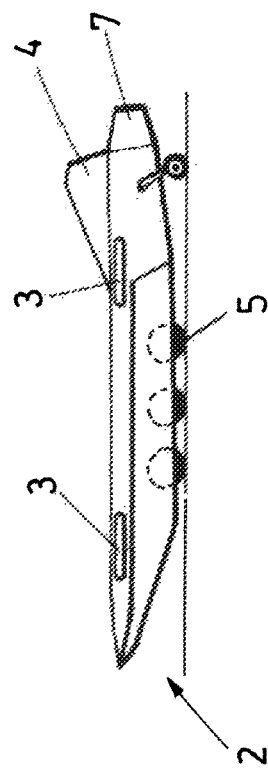
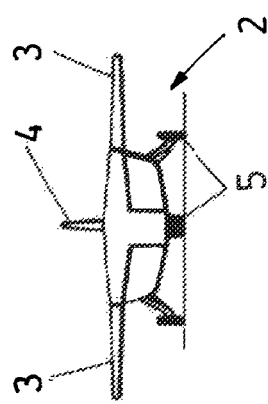
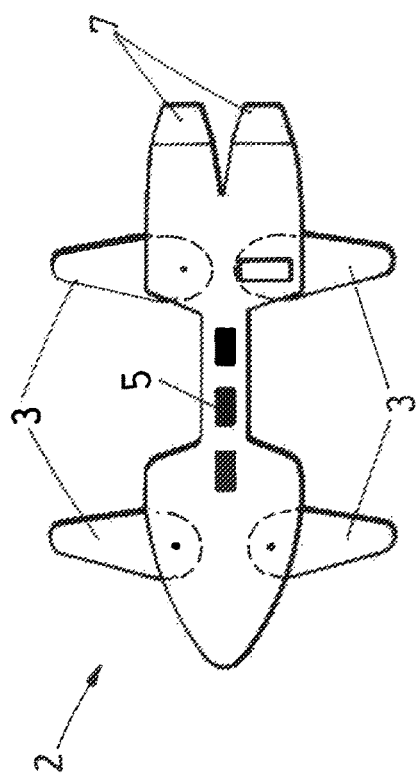

AIRCRAFT SYSTEM WITH ASSISTED TAXI, TAKE OFF, AND CLIMBING

CROSS-REFERENCES TO RELATED APPLICATIONS

This application claims the benefit of the European patent application No. 17382801.3 filed on Nov. 27, 2017, the entire disclosures of which are incorporated herein by way of reference.

TECHNICAL FIELD

The invention relates to the technical fields of: overall aircraft design, airframe concepts, and civil and military aircraft operations.

BACKGROUND OF THE INVENTION

Traditionally, aircraft operations, both civil and military, require that a number of aircraft systems and capabilities, are carried on board the aircraft during a complete flight or mission.

More in particular, in the case of commercial aircraft, it is required that the airframe perform in an autonomous manner, that is, without support from external equipment, all the phases of a complete revenue flight, namely: ground operation, push back, taxi out, take off, climbing, cruise, descent, landing and taxi to gate. For that purpose, all aircraft systems and features like aerodynamic and structure, are designed to perform all phases of a flight.

However, once the aircraft has reached its cruising altitude, there are a number of systems like: powerplant, landing gear, fuel tanks, etc., that are oversized for the rest of the flight, or even that are not required at all for the remaining flight phases.

It is known in other aerospace fields, to use detachable or expendable auxiliary components that are jettisoned from an air vehicle once they are no longer required.

For example, external fuel tanks have been used for decades to increase mission ranges in military aircraft, or as initial rocket stages in space vehicles, or for Short Take-off and Landing (STOL) operations of conventional aircraft.

On the other hand, British patents GB-0.429.948 and GB-0.525.015 are prior art examples disclosing the use of an auxiliary air vehicle for the assistance of a main air vehicle during take-off. Main and auxiliary air vehicles are mounted one on top of the other during take-off, such as once take-off is completed they are separated and fly independently.

The above-mentioned solutions are suitable for specific scenarios or missions, and all of them are focused on improving operative capabilities of an air vehicle from as technical point of view, that is, prior art solutions are directed to improving the capabilities of an air vehicle to carry our certain challenging missions.

However, none of these solutions have been conceived for reducing overall mission costs (reduction of fuel burn) or reduction in emissions or reduce production costs. Moreover, none of them have ever been implemented in the fields of commercial aircraft or heavy military transport on certified operational environments.

SUMMARY OF THE INVENTION

A general object of the invention is to reduce costs associated with aircraft operations and aircraft production. By optimizing the design (sizing) and capabilities of some systems of an aircraft, in accordance to what is actually required from those systems to complete a flight, a more efficient aircraft is obtained.

A more specific object of the invention is to reduce aircraft weight, thereby reducing fuel consumption and extending mission range.

The present invention significantly reduces fuel cost associated with aircraft operations and aircraft production, by disaggregating some aircraft systems into two air vehicles, each one of them optimized for different phases of a flight.

According to the invention, there are provided two air vehicles detachably connectable to each other, namely:
    a main air vehicle having an airframe adapted to carry the payload of a flight, and optimized for cruise and landing operations, and
    an auxiliary air vehicle embodied as an unmanned vehicle and adapted to cooperate with the main air vehicle during ground operations, taxing, take-off and climbing.

Both air vehicles are coupled together during the initial stages of a flight mission, that is, taxi-out, take-off and climbing, and during these phases, both air vehicles are controlled from the main air vehicle.

Once an optimum flight level or cruise altitude is reached, the auxiliary air vehicle is detached from the main air vehicle, as its equipment and systems are no longer necessary for the rest of the flight.

After detachment, the auxiliary air vehicle flies back to the airport of origin (or other), either in an automatic or remote unmanned operation, and the main air vehicle normally completes the rest of the flight to the destination, carrying out on its own cruise, descent, landing and taxing to gate phases.

More in detail, an aspect of the invention refers to an aircraft system with assisted take-off and climbing, comprising: a main air vehicle capable of performing autonomously, that is, without external assistance, the cruising and landing phases of a flight. For example, the main air vehicle is a commercial aircraft or a military transport aircraft.

The aircraft system further comprises an auxiliary air vehicle which is lighter than the main air vehicle, and it is adapted to assist (cooperate with) the main air vehicle during the ground operations, taxing, take-off and climbing phases of a flight. The main and auxiliary air vehicles are adapted to be detachably connectable, so that the auxiliary air vehicle assists the main air vehicle when both are attached to each other.

Preferably, the auxiliary air vehicle is detachably connectable to the belly of the main air vehicle. This configuration is considered optimum to ease ground maneuvering and docking of this auxiliary vehicle to the main air vehicle without external aids. This configuration also allows that the center of gravity of both vehicles is close enough to ensure the proper flight handling capabilities of both vehicles while they are attached together. The auxiliary air vehicle is provided with its own landing gear, such as when the main and auxiliary air vehicles are attached during taxing and take-off, the landing gear of both air vehicles are extended and on the ground, and in such a way that the auxiliary air vehicle partially supports the weight of the main air vehicle. For this purpose, the auxiliary air vehicle is advantageously arranged between the left and right (port and starboard) main landing gears of the main air vehicle.

A technical effect derived from this arrangement, is that aircraft airframe and landing gear of the main air vehicle, can be downsized. Additionally, the power plant of the main air vehicle is downsized, as the thrust of the powerplant of the auxiliary air vehicle is added.

During take-off phase, on a two engine conventional aircraft, the main dimensioning factor of the engines thrust is the capability of taking-off with only one engine at maximum power once that the decision speed (also known as V1) is reached and kept after take-off a minimum climb rate to avoid ground obstacles. Therefore, adding the additional thrust of the auxiliary air vehicle, enables that thrust reduction of the power plant of the main aircraft.

Consequently, the aircraft system of the invention as defined above, reduces the overall production and operation costs by downsizing equipment and optimizing the design of the main aircraft and reducing fuel burn, which in turn allow to:
- reduce airframe weight,
- reduce powerplant and systems weight,
- reduce production costs, as the main air vehicle can operate on its own in a given payload/range zone, while the auxiliary air vehicle allows an extended payload/range missions. This does not require expensive aircraft modifications to increase maximum take-off weight or increased range,
- reduce overall mission fuel consumption,
- reduce overall emissions (on ground and in flight)
- reduce take-off noise foot print
- increase mission range.

The auxiliary air vehicle can be designed for:
- an already existing airframe that with a number of modifications can fly coupled to this invention and can bring improvements such as increased range and increased maximum take-off weight
- With a new main aircraft design that would benefit of all the advantages that this concept might have. In addition to the one mentioned in the previous point, it can be added a further reduction of engines size (less thrust required for take-off) and reduction of system that are not required for cruise and landing phases.

BRIEF DESCRIPTION OF THE DRAWINGS

Preferred embodiments of the invention, are henceforth described with reference to the accompanying drawings, wherein:

FIG. 1 shows a side elevational view of a main air vehicle according to the invention, in this example comprising a conventional commercial aircraft fitted with two engines.

FIGS. 2A, 2B and 2C show several views of an auxiliary air vehicle according to the invention, wherein FIG. 2A is a front view; FIG. 2B is a side view; and FIG. 2C is a top view.

DETAILED DESCRIPTION OF THE PREFERRED EMBODIMENTS

Figure 3:
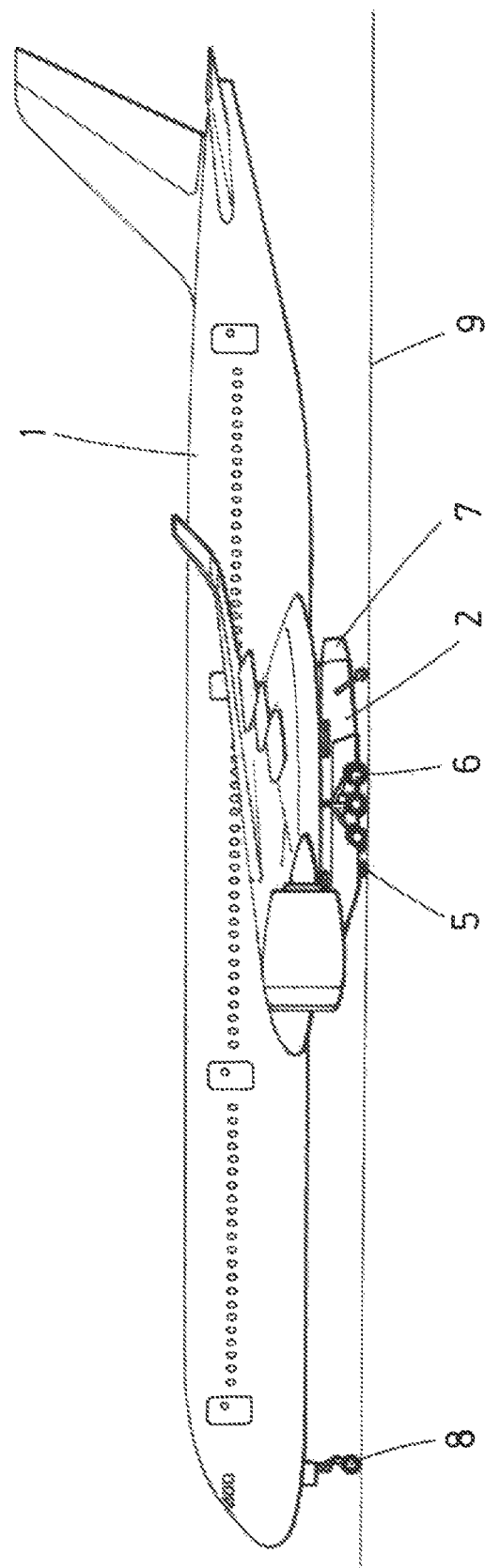
FIG. 3 shows a side elevational view of the aircraft system of the invention when main and auxiliary air vehicles are on the ground and attached to each other.
Figure 4:
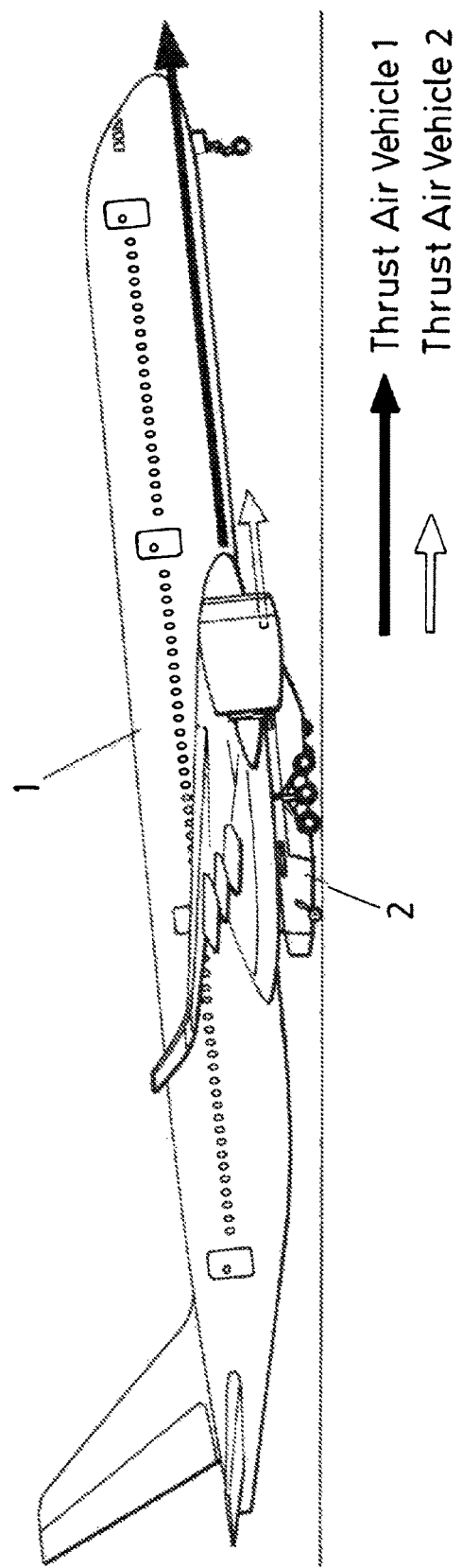
FIG. 4 shows the two air vehicles attached to each other during the initial stage of the take-off phase. The arrows in the figure, illustrate the thrust provided by the powerplant of both vehicles.
Figure 5:
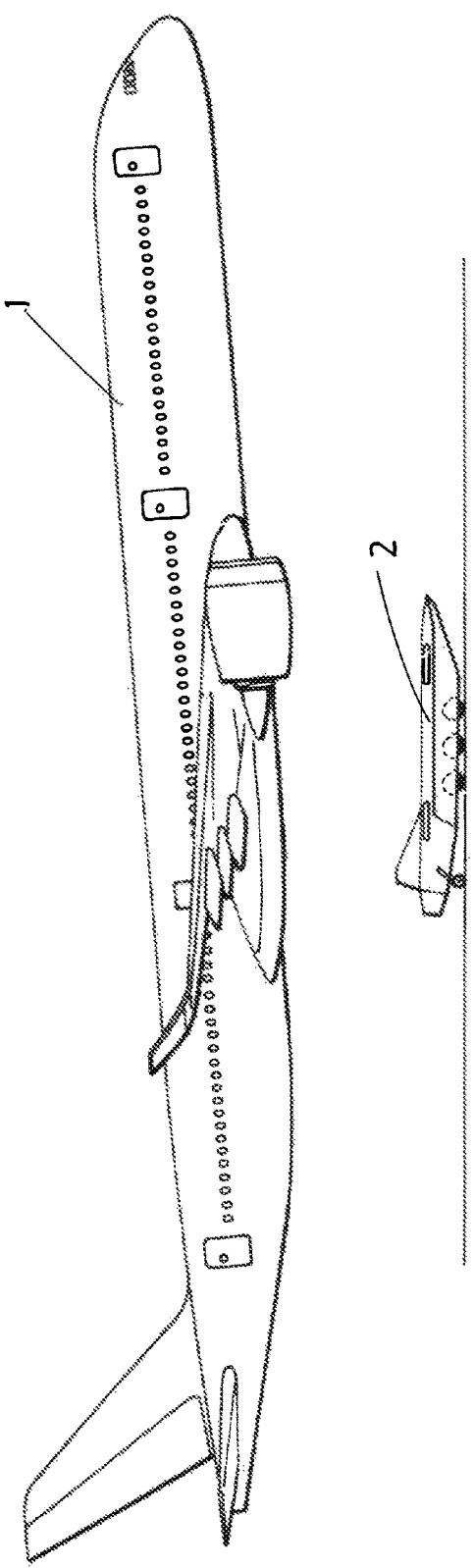
FIG. 5 shows in a side elevational view of the detachment operation between the two air vehicles.

As shown in the attached figures, the aircraft system of the invention comprises a main air vehicle (1) with a very similar appearance to a conventional commercial aircraft that is capable of carrying a payload, in this example passengers and cargo. The main air vehicle (1) has an optimized airframe to carry out autonomously the cruise, descent and landing phases of a flight.

This optimization involves:
- airframe aerodynamically optimized for cruise and landing phases;
- since vertical stabilizer does not require sizing for engine failure during take-off, the control surfaces are optimized for cruise and landing phases;
- engines sized for cruise phase, as they do not require sizing for single engine failure during take-off;
- smaller landing gear. Since the auxiliary vehicle has its independent landing gear that cooperates with the one of the main air vehicle, the landing gear of the main air vehicle can be made smaller so that the weight of the main air vehicle is significantly reduced,
- fuel tanks required for the range of the mission;
- nevertheless, the main air vehicle would be capable of completing a flight without the use of the auxiliary air vehicle, but with limited payload and range, which means that when the main air vehicle carries a full load, it could only take-off with the assistance of the auxiliary air vehicle.

FIGS. 2A-2C show an exemplary embodiment of an auxiliary air vehicle (2), which is lighter and smaller than the main air vehicle (1), and it is adapted to cooperate with the main air vehicle (1) during the taxing, take-off and climbing phases of a flight.

The auxiliary air vehicle (2) has the following features:
- it is an unmanned vehicle that can be recovered to base either in a fully automated and/or remotely controlled operation;
- it is equipped with a powerplant to provide additional thrust required for take-off and climbing phases. This powerplant may comprise:
  (a) conventional turbofan engines,
  (b) hybrid propulsion that uses a gas turbine that generates electricity that powers electric fans.
  (c) electric propulsion that uses batteries or fuel cell to store/generate electricity that powers electric fans The exhaust nozzles (7) can be conventional or vectorized (trimmable in y axes) to provide a partial thrust component in vertical direction. This can improve take-off performances and reduce the aircraft noise footprint in take-off phase.

For a powerplant shown in FIG. 2A or 2B, fuel tanks dimensioned to provide the required fuel quantity for take-off and climbing phases assisting the main air vehicle. When both vehicles are attached to each other during taxing, take-off, and climbing, fuel from the auxiliary air vehicle can be transferred to the main air vehicle in order to reduce fuel consumption of the main air vehicle (1) and extending mission range;

For a powerplant shown in FIG. 2C, the batteries or fuel cell with its required fuel would be stored in the fuselage of the auxiliary air vehicle.
- airframe optimized from an aerodynamic point of view for take-off and climb phases;
- extendable lifting (3) and control (4) surfaces. The auxiliary air vehicle (2) is configured such that its extendable lifting (3) and control (4) surfaces are retracted while the auxiliary air vehicle (2) is attached to the main air vehicle (1), and configured to deploy the lifting (3) and control (4) surfaces when the auxiliary air vehicle (2) is detached from the main air vehicle and while it flies and lands autonomously;
- structural support for the complete airframe when the air vehicle is on the ground;

landing gear (5) of the auxiliary air vehicle (2) capable of supporting the weight of the auxiliary vehicle and alleviating the weight that the landing gear of main air vehicle has to support, (the combination of the landing gears of both vehicles can withstand the maximum weight of the both air vehicles together). This landing gear has the capability to partially extend or retract to allow the on-ground docking maneuver with main air vehicle (1);

a small retractable accessible landing gear (10) used for the autonomous landing of the auxiliary air vehicle. This retractable landing gear (10) retracts when both vehicles operate together, as it is not required in this part of the mission. It can add the functionality that when it is extended and both air vehicles are attached together, it can prevent that during the loading/unloading the payload of the main air vehicle (1) there is a tipping back on the ground, but it is retracted for take-off phase.

Both landing gear (5) and (10) of the auxiliary air vehicle (2) have the capability of braking and ground steering, which are required for independent ground operations once it has landed.

the auxiliary air vehicle (2) is controllable from the main air vehicle (1) when both are attached to each other.

assisted motorized landing gear, that allows push back and taxi with main engines from main aircraft (1) turned off; electrical motors can provide this assisted power to the main landing gear (5) of the auxiliary air vehicle (2)

ground power: the auxiliary air vehicle (2) incorporates a dedicated power unit to provide electrical and pneumatic power to both air vehicles during ground operations (at gate or parked location). This unit can also provide the required power for the assisted taxi operations and perform taxiing operations in the airport with all propulsion engines (from main and auxiliary air vehicles) turned off.

FIG. 3 shows a combined vehicle according to the invention formed by the main and auxiliary vehicles (1,2) attached to each other, wherein the auxiliary air vehicle (2) is attached to the belly of the main air vehicle (1) and located between the left and right landing gear (6) of the main air vehicle (1), and the auxiliary air vehicle (2) partially supports the weight of the main air vehicle.

In the different phases of a flight, the operation of the aircraft system of the invention is as follows:

ramp and ground servicing operations: the ground power is supplied by the power unit from the auxiliary air vehicle (2). Turn around operations and aircraft servicing are done with all engines off;

Push back: the assisted powered main landing gear (5) of the auxiliary air vehicle (2) can move both vehicles backwards, eliminating the need for a towing car that performs the push back operations;

taxi out: the power unit the auxiliary air vehicle (2) provides electrical power to carry out assisted autonomous taxi in this phase;

in the taxi out phase, all engines are started from the power unit and warmed up before take-off phase;

take off: the thrust required for take-off is provided by all available engines, that is, the combination of the powerplants of both air vehicles;

initial climb phase: the vectorized thrust provides an additional climb rate and helps to reduce the take-off ground noise footprint;

for the climb phase, fuel used by the main engines can also be provided by the auxiliary air vehicle, maximizing the use of fuel tanks for the cruise phase.

once the optimal altitude or climbing phase is completed, the auxiliary air vehicle separates from the main air vehicle. The detachment operation is commanded from the main air vehicle;

the auxiliary air vehicle deploys its extendable wings and control surfaces (3, 4) and returns to base, unmanned and independently to the airport of origin or other base. The extension of the extendable wings can be done before the separation of both vehicles to reduce the loads that this maneuver can induce on the main aircraft (1);

cruise phase: the main air vehicle continues to destination. The main engines are designed and sized for this flight phase, which provides an optimum fuel burn and flight range;

descent and landing: completed by main air vehicle (1).

In a practical implementation of the invention, an airline or air force would operate a fleet of main air vehicles and a fleet of auxiliary vehicles distributed in several airports or air fields, such as any pair of main and auxiliary vehicles of the fleets are connectable. In this way, a main air vehicle according to the invention, embodied for example as a commercial aircraft, can fly from airport to airport to complete a predefined route.

As shown in FIG. 3, the auxiliary air vehicle (2) is dimensioned, especially its height, such as it can fit between the ground and the lowest part of the belly of the main air vehicle. When a main air vehicle (1) lands on an airport of destination, an auxiliary air vehicle (2), running on its own landing gear or dedicated wheels, is arranged and attached to the belly of the main air vehicle as shown in FIG. 3, as to prepare the main air vehicle (1) for the next flight. This docking operation can be done once the main air vehicle (1) has arrived at the gate or just after landing, which can contribute even further to fuel consumption optimization, as the taxi to gate operation could be carried out with the main engines from main air vehicle (1) turned off.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft system with assisted take-off and climbing, comprising:
 a main air vehicle capable of performing autonomously the cruising and landing phases of a flight,
 an auxiliary air vehicle lighter than the main air vehicle and configured to assist the main air vehicle during taxiing and take-off phases of a flight,
 wherein the main and auxiliary air vehicles are configured to be detachably connectable, so that the auxiliary air vehicle assists the main air vehicle when both are attached to each other during taxiing, take-off and climbing, and wherein the auxiliary air vehicle is an unmanned air vehicle and is further configured to fly and land when the auxiliary air vehicle is detached from the main air vehicle.

2. The aircraft system according to claim 1, wherein the main air vehicle has a nose landing gear and main landing gear including left and right landing gear, and wherein the main and auxiliary air vehicles are configured so that the auxiliary air vehicle is detachably connectable to a belly of the main air vehicle and between the left and right landing gear.

3. The aircraft system according to claim 1, wherein the auxiliary air vehicle has a landing gear, and wherein the main and auxiliary air vehicles are configured such that when they are both connected during taxing and take-off, the landing gear of both air vehicles are extended and on the ground, and wherein the auxiliary air vehicle partially supports a weight of the main air vehicle.

4. The aircraft system according to claim 1, wherein the main air vehicle is configured to carry a payload, and wherein a maximum thrust of a power plant of the main air vehicle is selected such that when the main air vehicle carries a full load, the main air vehicle can only take-off with assistance of the auxiliary air vehicle.

5. The aircraft system according to claim 1, wherein the main and auxiliary air vehicles have respective fuel systems, or electric energy storage/power generation devices, and wherein both air vehicles are configured such that, when they are connected to each other, fuel, or electric energy, from the auxiliary air vehicle is transferrable to the main air vehicle.

6. The aircraft system according to claim 1, wherein the auxiliary air vehicle is an autonomously or remotely operated vehicle.

7. The aircraft system according to claim 1, wherein the auxiliary air vehicle comprises extendable lifting and control surfaces, and wherein the auxiliary air vehicle is configured such that its extendable lifting and control surfaces are retracted while the auxiliary air vehicle is coupled with the main air vehicle, and the lifting and control surfaces are deployed when the auxiliary air vehicle is detached from the main air vehicle.

8. The aircraft system according to claim 1, wherein the auxiliary air vehicle is controllable from the main air vehicle when both are attached to each other.

9. The aircraft system according to claim 1, wherein a powerplant of the auxiliary air vehicle comprises at least one of at least one turbofan engine or at least one electric engine.

10. The aircraft system according to claim 9, wherein the auxiliary air vehicle comprises one turbofan engine and a vectorized exhaust nozzle coupled with the turbofan engine.

* * * * *